INVENTORS
Ulf Carl Iwar Sellman
Gunnar Arthur Ericsson
By Sommers & Young
Atty's ic rear section 7, having a central hole 8 and a front part 9 having a plane front surface 10. The diaphragm 6 of the microphone faces the hole 8, i.e. backwards.

United States Patent Office
3,476,208
Patented Nov. 4, 1969

3,476,208
ARRANGEMENT IN AN ACOUSTICALLY OPERATING TARGET INDICATOR
Ulf Carl Iwar Sellman, Roslags Nasby, and Gunnar Arthur Ericsson, Stockholm, Sweden, assignors to AB FLYGMAL Air Target Ltd., Stockholm, Sweden, a Swedish joint-stock company
Filed May 20, 1968, Ser. No. 730,558
Int. Cl. G10k 11/00, 11/06; G01s 3/80
U.S. Cl. 181—.5    7 Claims

ABSTRACT OF THE DISCLOSURE

Aerodynamically shaped bodies containing a microphone unit concentrically positioned are used as miss distance indicators when training shooting towards airborne targets, the microphone unit being actuated by the bow wave of the projectile, penetrating a sound inlet encircling the body adjacent the diaphragm of the microphone. In accordance with the invention it has been found that a more uniform response of the microphone unit, irrespective of the incidence direction of the bow wave, is obtained if the sound inlet is restricted to only a portion, preferably 180° of the periphery of the body, as contrasted to the conventional arrangement, where the sound inlet is distributed over all the periphery (360°) of the body.

---

When training shooting towards airborne targets, it is desirable that the target is equipped with a hit indicator for measuring the distance from the target at which the fired projectiles are passing it. This distance is usually called the "miss distance." When firing automatic weapons, for example, hit indicators of the acoustic type are those most commonly used. Such an acoustic hit indicator uses one or more sound responsive elements, e.g. microphones, which in response to the sound energy received by the diaphragm members of the microphones convert said energy into electric pulses.

Every projectile travelling at a supersonic speed produces a bow wave—i.e. a concentric thin layer of compressed air—which wave propagates as sound speed, perpendicularly to the front direction. The energy contents are reduced successively as it propagates in the air space; i.e. the longer distance the bow wave has travelled from the projectile path, the weaker will be the electrical pulse derived from a bow wave responsive microphone. This feature is utilized in acoustic hit indicators to determine the miss distance of a projectile.

The metric value of the miss distance is principally obtained by comparing the magnitude of the microphone output signal or pulse with pulse magnitudes obtained as a result of calibration firing using the corresponding types of hit indicators and projectiles.

For obtaining highly precised measuring results when measuring miss distances by means of acoustic hit indicators, especially in shooting towards airborne targets, it is important that the microphone unit is arranged such that—at one hand—the noise over the microphone produced by the speed-wind is low, and—at the other hand—that the amplitude of the microphone output resulting from a projectile passing at a given miss distance from a target has a constant value and independent of the striking angle (angle of incidence) of the projectile and, thus, also that of the layer of the bow wave, with respect to the microphone unit.

It is a known fact that the above-mentioned air noise over a microphone may be considerably reduced by building-in the microphone in an aerodynamically shaped body, in the following called a "microphone body." The microphone is then preferably positioned concentrically in the microphone body with its diaphragm facing backwards with respect to the moving direction of the microphone body. A sound inlet is provided through the wall of the housing or shell of the microphone body, e.g. by distributing small openings or "windows" in a rotation-symmetrical annular array around the microphone body immediately behind or in any way adjacent to the diaphragm. The sound inlet openings are usually covered by a fine-meshed cloth or a metal screen having only a very small damping effect on an incoming bow wave but which reduces the noise over the microphone due to the speed-wind.

A microphone arranged in accordance with the above has, however, the drawback that its response to a given bow wave energy varies in accordance with the striking angle of the bow wave layer with respect to the microphone body.

The purpose of the present invention is to eliminate this drawback, and to provide an acoustic hit indicator, having microphones or other sound responsive means housed within aerodynamically shaped bodies, which indicator has a response or sensibility to bow wave energy striking said bodies, that is substantially independent of the striking direction of the bow wave.

The invention is based on our observation at practical tests, that an element (transmitter) consisting of a microphone concentrically arranged within an aerodynamically shaped body and having a sound inlet also concentrically arranged through the housing of the body close to the diaphragm of the microphone, is rendered a sensibility to incoming bow wave energy, that is less dependent of the striking direction of the bow wave, if said sound inlet is provided over only a restricted part of the periphery around the body than if the sound inlet is distributed along the whole periphery. Further, we have observed that by combining two principally mirror-arranged transmitters according to the invention, a substantially circular direction pattern is obtained.

Thus, the invention contemplates an arrangement in an acoustic operating hit indicator for towed airborne targets, and consisting of an aerodynamically shaped body enclosing a sound responsive element, as a microphone assembly, being positioned substantially concentrically in the body and actuable through a sound inlet having its active extension directed along the periphery of the body, the arrangement being characterized by the fact that the sound inlet extends over a radial angle considerably less than 360°, preferably about 180°, whereby the sound response of the element is made substantially independent to a striking angle range over at least half the periphery of the body.

The arrangement of the invention will be described below in a greater detail with reference to the enclosed drawings.

Figure 1:
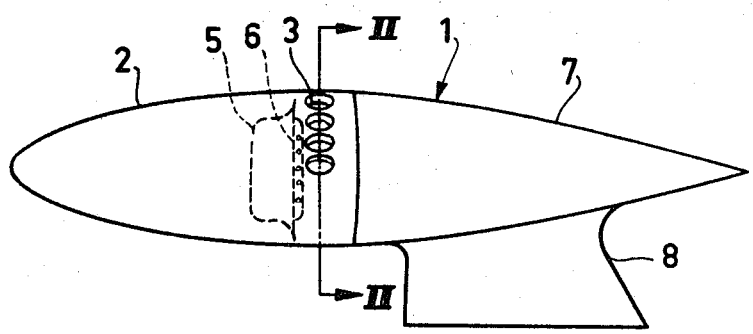
FIGS. 1 and 2 are a side view and a transverse section, respectively, along the line II—II, of a microphone body according to the invention.

Referring to the drawings, 1 generally indicates the microphone body consisting of a nose section 2 having a sound inlet in the form of an array of openings or holes 3 distributed along the periphery of the nose section in a plane normal to the longitudinal axis of the body. The array of holes extend over a radial angle 4 (FIG. 2) of about 180°. The microphone body further includes a microphone capsule 5 with a diaphagm 6, an aerodynamically shaped rear section 7 and a supporting stem 8 for the microphone body.

Figure 2:
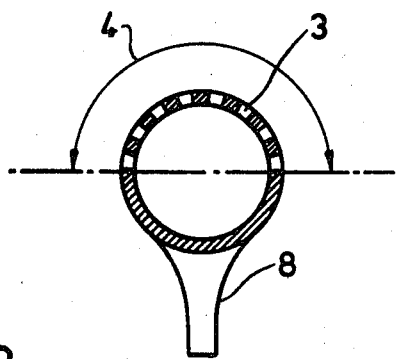
Figure 3:
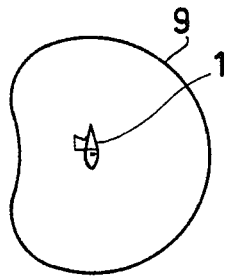
FIG. 3 is a response pattern or curve for the device shown in FIGS. 1 and 2.
Figure 4:
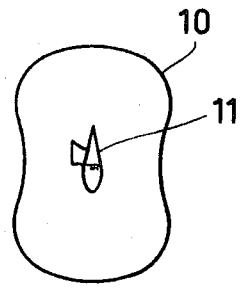
FIG. 4 is a response curve for the conventional type of microphone body.

FIG. 2 discloses a response curve or direction pattern 9 of a microphone body 1 in FIGS. 1 and 2. From the diagram it is obvious that the curve has a generally circular shape (i.e. representing a constant transmitter senbility) over that half of the diagram—with respect to the longitudinal axis of the transmitter—that corresponds to the transmitter half provided with the sound inlet. As a contrast, there is shown in FIG. 4 the corresponding diagram 10 of a microphone body 11, where its sound inlet is extending over all the periphery around the nose section 2.

The forming in detail of the sound inlet for a transmitter in accordance with the invention is not critical. Thus, the inlet may be formed as one or more rows of holes or slots, or as one or more continuous slits. The portion of the periphery around a microphone body 1 according to the invention, where the sound inlet is absent—i.e. the "covered" portion—is preferably facing the supporting stem 8, as shown in FIG. 1. By this measure, the substantially circular half of the direction pattern of the transmitter will be facing outwards as seen from the mounting area of the transmitter.

Figure 5:
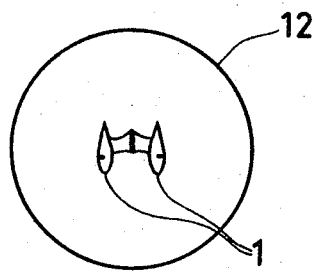
FIG. 5 is a response curve for a combination of two microphone bodies according to the invention.
Figure 6:
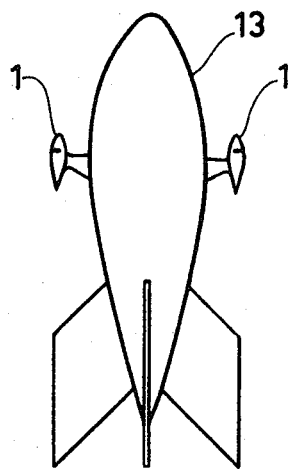
FIG. 6 is an airborne target equipped with said combination.

By assembling two principally similar transmitters of the invention with their mounting areas facing each other, as shown in FIG. 5, i.e. with the two transmitters mirror-positioned, and by connecting the transmitters electrically to the hit indicator in such a way that the microphone pulse from either of the two transmitters, having the largest amplitude, also is used for determining the miss distance, a direction pattern 12 will result which has a substantially circular form all around the periphery of the body; i.e. the desired purpose is realized, viz. rendering the sensibility or response of the hit indicator substantially independent of the striking (incident) direction of a given bow wave. In practice, this means that the target angle—i.e. the angle between the respective paths of the projectile and the target—will not affect the results. In FIG. 6, there is shown such an arrangement as practically applied to a towed airborne target 13, where the two microphone bodies 1 are secured to diametrically opposite areas of the target body.

One modification of the invention for practical purposes is obtained by providing, in one and the same aerodynamically shaped microphone body, a microphone assembly consisting of two (or more) microphones in coaxial and spaced relation, and a sound inlet is provided for each microphone in such a manner that the sound inlet associated to one microphone encloses one half sphere of the transmitter, while the sound inlet associated to the second microphone encloses the opposite half sphere. The resulting direction pattern for a transmitter of the last-mentioned type will have a general resemblance to the corresponding pattern for the two oppositely positioned transmitters according to FIG. 4.

Also other than the embodiments described above are within the scope and spirit of the invention.

What we claim is:

1. An arrangement in an acoustically operating hit indicator for towed airborne targets, comprising an aerodynamically shaped body, a sound responsible element positioned substantially concentrically within said body, a sound inlet having its active extension directed along the periphery of the body for actuating the sound response element, the improvement being that the sound inlet extends over a radial angle considerably less than 360°, whereby the sound response of said element is made substantially independent to a striking or incident angle range over at least half the periphery of the body.

2. An arrangement according to claim 1, wherein the sound responsive element is a microphone assembly.

3. An arrangement according to claim 1, wherein the sound inlet extends over a radial angle of about 180°.

4. An arrangement according to claim 1, wherein the sound inlet is formed by at least one open slit.

5. An arrangement in an acoustically operating hit indicator for towed airborne targets, comprising a combination of two aerodynamically shaped bodies, a sound responsive element being positioned substantially concentrically within each of said bodies, a sound inlet having its active extension directed along the periphery of each of the bodies over a radial angle less than 360°, the two bodies being in such a positional relationship, that the resulting sensibility or response of the combination is substantially independent of the incident direction of sound striking said combination.

6. An arrangement according to claim 4, wherein the active extension of the sound inlet is about 180°, the two bodies being mirror-positioned opposite each other.

7. An arrangement according to claim 4, wherein each sound inlet is formed by at least one open slit.

References Cited

FOREIGN PATENTS 652,032   4/1951   Great Britain.

RODNEY D. BENNETT, Jr., Primary Examiner

C. E. WANDS, Assistant Examiner

U.S. Cl. X.R.

181—26; 340—16